(12) United States Patent
Piccioni

(10) Patent No.: US 7,353,579 B2
(45) Date of Patent: Apr. 8, 2008

(54) FLANGE RESTORING DEVICE AND METHOD

(75) Inventor: Eric Piccioni, Chambly (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 331 days.

(21) Appl. No.: 11/044,201

(22) Filed: Jan. 28, 2005

(65) Prior Publication Data
US 2006/0168790 A1 Aug. 3, 2006

(51) Int. Cl.
*B21D 1/00* (2006.01)
*B21D 5/00* (2006.01)

(52) U.S. Cl. .............................. 29/402.19; 29/402.01; 72/124; 72/125; 72/126; 72/83; 72/84

(58) Field of Classification Search ............. 29/402.01, 29/402.19; 72/124, 210, 211, 220, 82, 83, 72/84, 85, 86, 101, 107, 118, 119, 126, 215, 72/216

See application file for complete search history.

(56) References Cited

U.S. PATENT DOCUMENTS

| | | | | |
|---|---|---|---|---|
| 1,374,604 A | * | 4/1921 | Peters | 72/199 |
| 1,597,575 A | | 8/1926 | Bowman | |
| 1,656,277 A | | 1/1928 | Haak et al. | |
| 1,932,376 A | * | 10/1933 | Nyberg | 72/415 |
| 2,254,289 A | | 9/1941 | Jensen | |
| 2,313,228 A | * | 3/1943 | Domonkos | 72/211 |
| 2,641,945 A | * | 6/1953 | Harris | 72/211 |
| 2,840,136 A | | 6/1958 | Bellarts | |
| 3,007,242 A | * | 11/1961 | Hauer et al. | 29/898.01 |
| 3,196,655 A | | 7/1965 | Hedgecock et al. | |
| 3,209,571 A | | 10/1965 | Wilson | |
| 3,290,915 A | * | 12/1966 | Cornell | 72/240 |
| 3,811,308 A | * | 5/1974 | Marcovitch | 72/210 |
| 4,000,639 A | * | 1/1977 | Postema | 72/316 |
| 4,802,355 A | | 2/1989 | Ezell | |
| 4,825,676 A | | 5/1989 | Diggins | |
| 4,905,492 A | * | 3/1990 | Lobakk | 72/117 |
| 5,097,690 A | * | 3/1992 | Adams | 72/123 |
| 5,345,801 A | | 9/1994 | Paakkunainen | |
| 5,477,720 A | | 12/1995 | Lentz et al. | |
| 5,501,093 A | | 3/1996 | Paakkunainen | |
| 6,345,427 B1 | * | 2/2002 | Bostic | 29/402.19 |
| 6,477,879 B1 | * | 11/2002 | Sawa | 72/220 |
| 6,536,092 B2 | * | 3/2003 | Nakayama | 29/558 |
| 6,644,083 B2 | | 11/2003 | Pakker | |
| 6,672,122 B2 | * | 1/2004 | Mustread et al. | 72/101 |
| 2005/0278922 A1 | * | 12/2005 | Jacobs | 29/402.19 |

FOREIGN PATENT DOCUMENTS

DE 4137188 A1 * 5/1993
EP 561083 A1 * 9/1993

* cited by examiner

*Primary Examiner*—Essama Omgba
(74) *Attorney, Agent, or Firm*—Ogilvy Renault LLP

(57) ABSTRACT

A method and a device for straightening out irregularities in a flange by pressing a roller against a first side of the flange while supporting an opposite side thereof to preserve the angle between the flange and the part when undergoing compression loading by way of the roller.

22 Claims, 5 Drawing Sheets

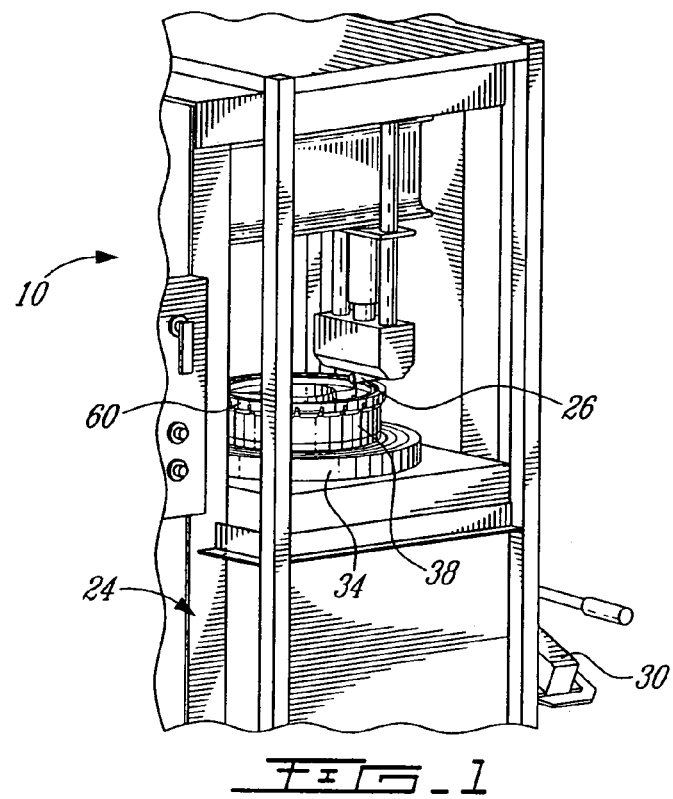
FIG_1
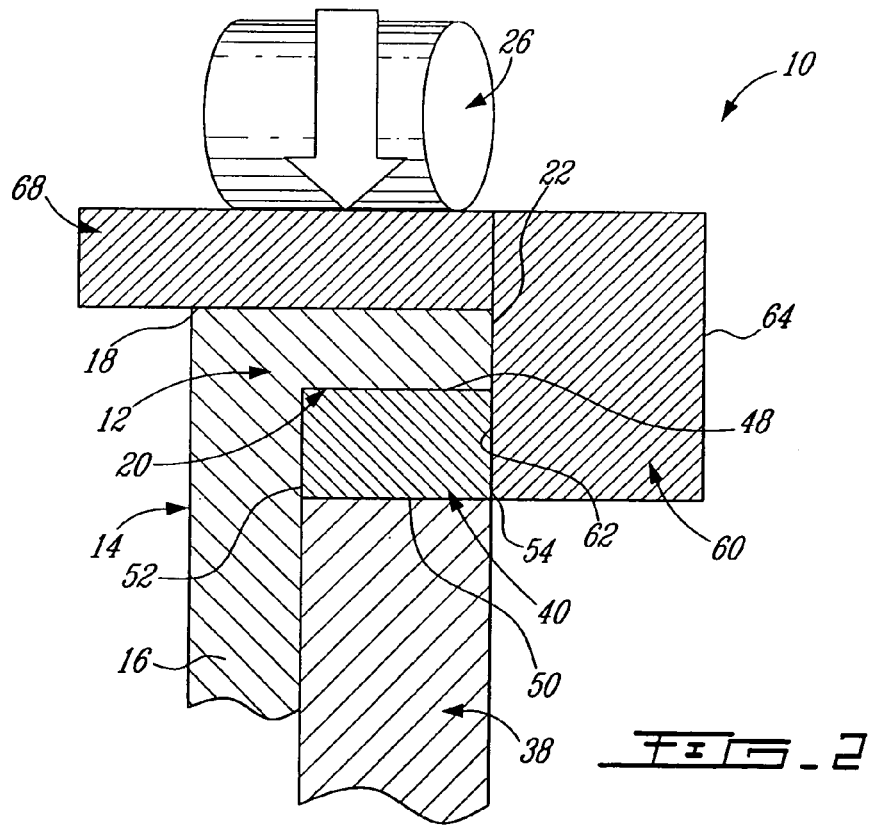
FIG_2

FLANGE RESTORING DEVICE AND METHOD

TECHNICAL FIELD

The invention relates generally to engine parts and, more particularly, to an improved method for restoring a flange of an engine part and device for doing same.

BACKGROUND OF THE ART

A current approach for reworking flanges of various engine parts involves brute force bending the flange at discrete locations with a mechanical hand press. There are numerous disadvantages to the device and process involved. A first disadvantage is that it is significantly dangerous for employees to operate the hand press due to the excessive effort required to obtain the desired result. Several recorded accidents and numerous unrecorded incidents have occurred. Consequently, many operators refuse to do the job claiming that the working conditions are unacceptable.

A second disadvantage is that the quality of restoring flanges, within a particular tolerance, using the above-mentioned device is inconsistent. This is largely due to the fact that the pressure applied by the operator is not readily measurable, thus, results may vary considerably. More specifically, the application of pressure on a flange is determined by the effort applied on the handle of the device by the operator. In an attempt to gain the last thousandths of the tolerance, an operator may surpass the acceptable limit. Furthermore, the weight of the operator is a determining factor of the amount of pressure applied; hence, diverse operators yield varying outcomes resulting in inconsistent quality.

A third disadvantage is that the turn around time relevant to the use of the mechanical hand press and corresponding method involved is extensive due to the numerous secondary operations required known in the art.

Accordingly, there is a need to provide an improved device and method for restoring a flange of an engine part so as to overcome the disadvantages set forth of the presently known device.

SUMMARY OF THE INVENTION

It is therefore an object of this invention to provide a method of restoring a flange which addresses the above-mentioned concerns.

In one aspect, the present invention provides a method of restoring a flange which has become distorted over time, the flange projecting at an angle from a component part, the method comprising the steps of: a) providing a support element on a first side of the flange, rolling a load applying element over a second opposite side of the flange with said support element reacting the compressive loads applied by said load applying element on said flange; and maintaining the angle between the flange and the component part during load application by way of the support element.

In another aspect, the present invention provides a method of restoring a flange extending at an angle from a part, the method comprising the step of: straightening out irregularities in the flange by pressing a roller against a first side of the flange while supporting an opposite side thereof to preserve said angle between the part and the flange when undergoing compression loading by way of said roller.

In another aspect, the present invention provides a method of flattening a circular radial flange, comprising the steps of: a) applying a flattening load to one side of the flange sequentially around a circumference of the flange, and b) providing a plurality of ring segments on an opposite side of the flange to oppose the flattening load.

In another aspect, the present invention provides a device for straightening out irregularities in a flange projecting at an angle from a part, comprising a roller for applying a flattening load against a first side of the flange, and a fixture for holding the part to be reworked, the fixture having a seat against which a second opposed side of the flange is supported to preserve the angle of the flange relative to the part while undergoing compression loading by way of said roller, said roller and said seat being relatively movable towards and away from each other, said roller being displaceable relative to said seat in a plane parallel thereto once pressed against the flange to apply a compressive load perpendicularly to the seat along the perimeter of the flange.

Further details of these and other aspects of the present invention will be apparent from the detailed description and figures included below.

DESCRIPTION OF THE DRAWINGS

Reference is now made to the accompanying figures depicting aspects of the present invention, in which:

FIG. 1 is a perspective assembled view of the flange restoring device operated to straighten a flange of an engine part to be restored in accordance with an embodiment of the present invention;

FIG. 2 is a schematic view of the flange restoring device shown in FIG. 1;

DETAILED DESCRIPTION OF THE PREFERRED EMBODIMENTS

Figure 3:
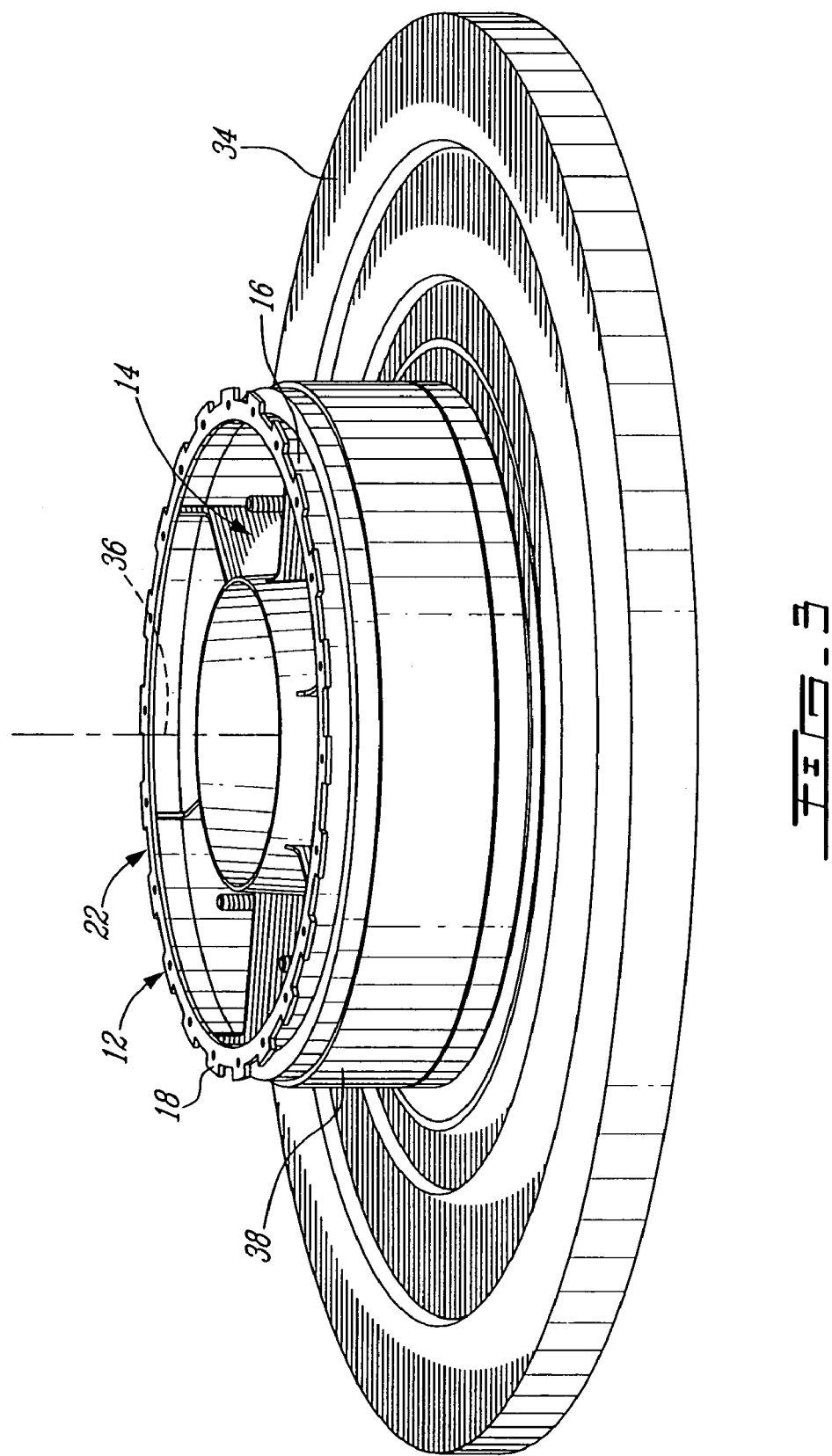
FIG. 3 is a perspective view of the engine part in a fixture on a rotary table forming part of the device shown in FIG. 1.

FIG. 1 illustrates a device 10 for restoring a flange 12 of a gas turbine engine part 14, such as a turbine exhaust duct. It is understood however that the present flange straightening method could be used for straightening out irregularities in flanges of a wide variety of component parts. In an exemplary embodiment of the present invention shown in FIG. 2, the engine part 14 is made up of a cylindrical body 16 and a bent circular radial flange 12 requiring straightening. In detail, the flange 12 has a rectangular cross section substantially perpendicular to the cylindrical body 16 as best illustrated in FIG. 2. The flange 12 can be described as having a first surface 18 opposing a second surface 20 circumscribed by a perimeter 22. In this particular case, the first surface 18 is the top surface while the second surface 20 is the bottom surface or underneath of the flange 12. It should be noted that alternative flange configurations are also possible. For example, the flange 12 could have a conical cross section or could be circular yet discontinuous around the circumference of the cylindrical body 16. Moreover, the device 10 could be designed to accommodate engine parts of varying shape without departing from its inventive nature.

Figure 8:
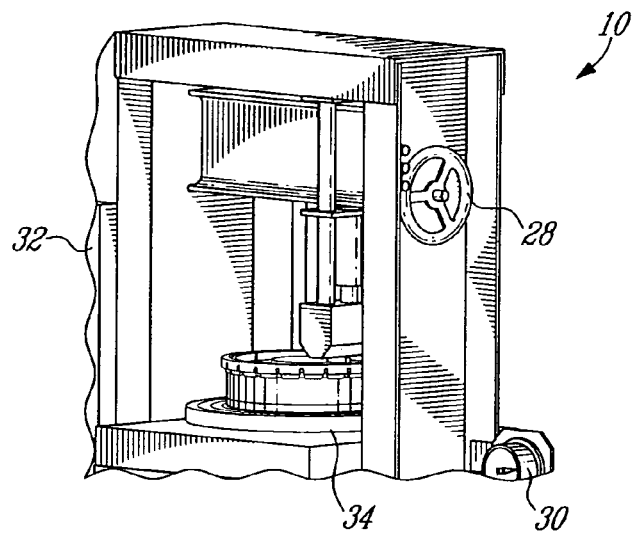
FIG. 8 is a perspective view of a hand wheel being operated to position a load applying roller over the flange of the engine part to be reworked.
Figure 9:
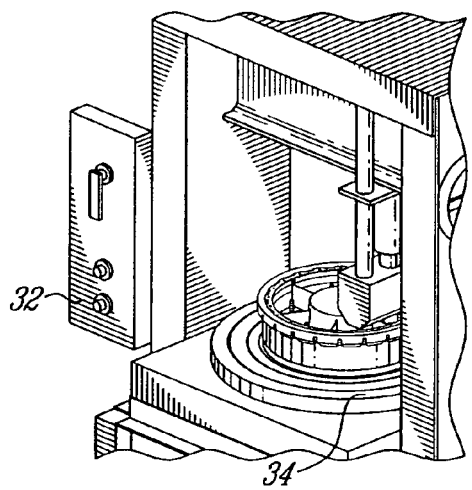
FIG. 9 is a perspective view of the control box of the flange restoring device in FIG. 1.
Figure 10:
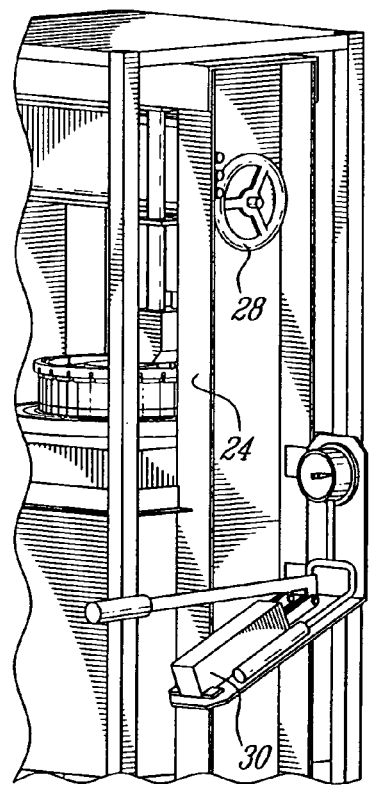
FIG. 10 is a perspective view of a hydraulic hand pump of the flange restoring device in FIG. 1.

Essentially, the device 10 restores the flange 12 by cold reworking it to its original form within given tolerances without the removal of material. As shown in FIG. 1, the flange restoring device 10 includes an "H" frame press 24 similar to any conventional press known in the art, which supports a hydraulic roller 26 movable for proper positioning with respect to the flange 12 by way of a hand wheel 28 (FIG. 8). The device 10 further includes a hydraulic hand pump 30 (as best shown in FIG. 10) for generating a measurable amount of pressure required to straighten the flange 12 and a control box 32 (FIG. 9) having a programmable logic controller (P.L.C.), a timer, failsafe cycle start controls and a power cut-off.

Referring to FIGS. 1 and 3, a turn table 34 with a vertical central axis 36 (FIG. 3) of rotation is also included as part of the device 10 for restoring the flange 12. The turn table 34 must be durable for repeatedly withstanding high loads that need to be sustained in order to rework the flange 12. The rotary table 34 is preferably electrically driven and controllable by the control box 32.

The device 10 further includes a fixture 38 adapted for receiving the engine part 14 and for permitting the straightening of the flange 12 in both the radial and the axial directions through the use of a pressure applied by the hydraulic roller 26 as illustrated in FIG. 2. More specifically, the fixture 38 as depicted in FIG. 3 receives the cylindrical body 16 such that a portion of the cylindrical body 16 with the flange 12 protrudes upwardly therefrom. The fixture 38 is securely mounted on the rotary table 34. It is preferably centered about the central axis 36 of the rotary table 34 allowing for the center of the engine part 14 to align therewith upon insertion into the fixture 38. By aligning the centers of the rotary table 34, the fixture 38 and the engine part 14 a balance and stability is created, which is beneficial when load application is involved. As an exemplary embodiment the fixture 38 is cylindrical for simplifying the inclusion of the cylindrical body 16, the latter fitting snugly within the fixture 38.

Referring now to FIGS. 2, the device 10 also includes at least one seat or support element 40 for supporting the second surface 20 or underneath of the flange 12 to react the load on the first surface 18 applied by the hydraulic roller 26 during operation of the device 10, as will be described in detail hereinafter. The fixture 38 is adapted to receive the support element 40, acting as a base configured to mate with the latter.

Figure 4:
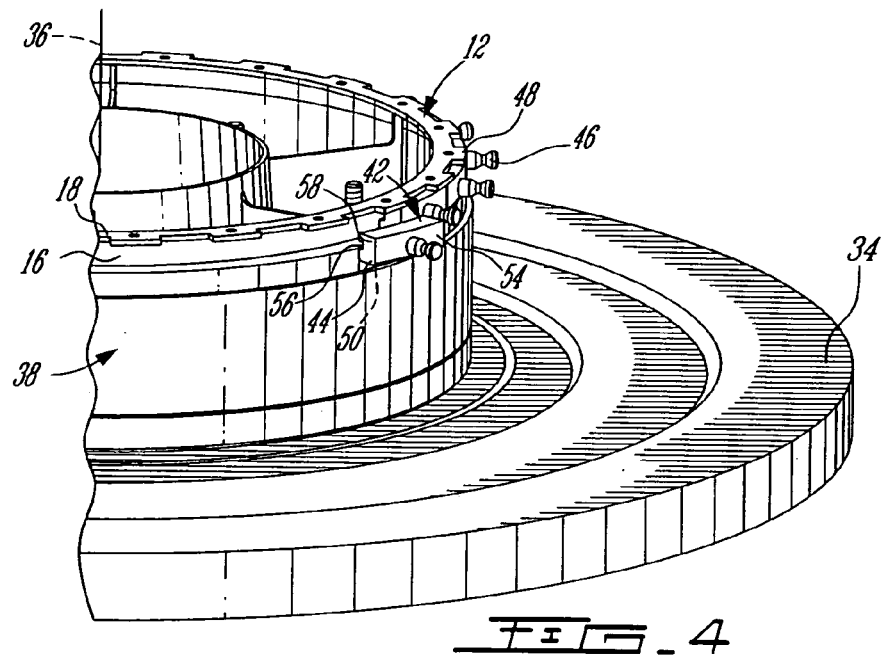
FIG. 4 is a perspective view of a plurality of torus segments being installed underneath the flange to be reworked.
Figure 5:
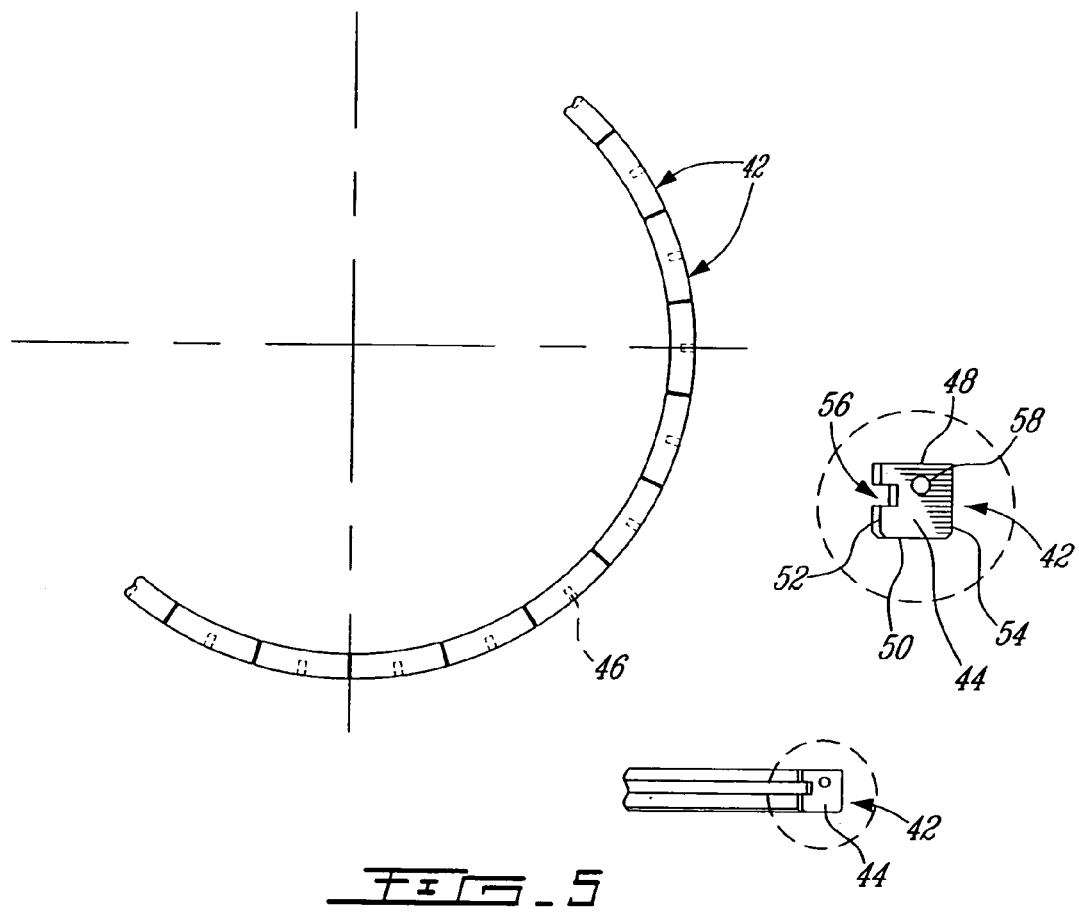
FIG. 5 is a sectional view of one of the torus segments shown in FIG. 4.
Figure 7:
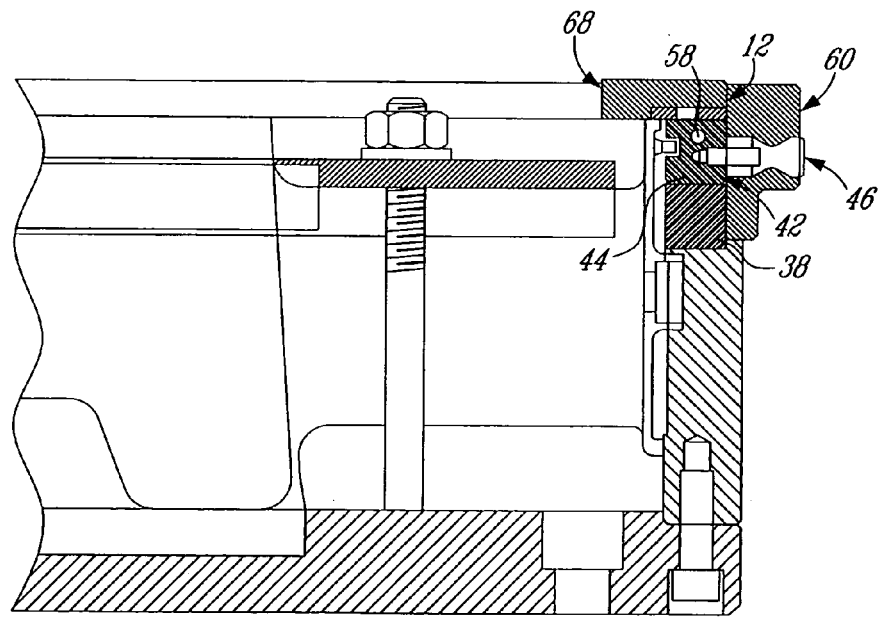
FIG. 7 is a sectional view of the flange restoring device shown in FIG. 1.

In the illustrated embodiment, the support element 40 comprises a discrete number of torus or toroidal segments 42 (see FIGS. 4, 5 and 7). A primary feature of the torus segments 42 is that they permit for a flexible support of the flange 12: yielding the flexibility required to bend the flange 12 in order to straighten it. More particularly, each torus segment 42 has the ability to flex or tilt towards or away from the central axis 36 of rotation and also expand in the tangential direction along the circumference of the cylindrical body 16 as the engine part 14 is rotated and the pressure is applied. In practice, the segments 42 themselves do not move outwards but rather (thru the use of an adequate lubricant) permit the flange 12 to slide across as required to straighten out the bends. Preferably, the torus segments 42 are spaced equidistantly around the circumference of the cylindrical body 16 as best illustrated in FIG. 4. If the spacing between the torus segments 42 is too great the flange 12 may potentially bend in an unwanted form when loaded, particularly at the locations lacking support. Hence, by equally spacing the torus segments 42 the possibility of having a gap that exceeds the acceptable limit is avoided.

Referring concurrently to FIGS. 4, 5 and 7, the torus segments 42 will now be described in detail. As depicted in the above-specified Figures, the torus segments 42 each include a core 44 with a radially outwardly protruding piece 46 attached thereto. The core 44 has a toroidal cross section (somewhat semicircular cross section) and can be further defined as having a flat top, a curved bottom, an inside and an outside surface 48, 50, 52 and 54 respectively. The protruding piece 46, whose function will become clear later on, is attached to the outside surface 54 of the core 44.

In this exemplary embodiment, the piece 46 is attached by way of being press fit and bolted into an aperture (not shown) present in the outside surface 54 of the core 44 and is preferably centered with respect to the outside surface 54 (FIG. 7). However, it should be noted that alternatives attachment means and locations are also possible so long as the flexibility of the torus segments 42 is not hindered. Similarly, the shape of the protruding piece 46 can also vary. In this embodiment it is depicted as a cylindrical type piece, but other configurations could work as well.

Referring now particularly to FIGS. 5 and 7, it can be seen that the bottom surface 50 of the core 44 has a convex curvature designed to sit atop the fixture 38 that has a matching concavity for receiving the bottom surface 50. The top surface 48 of the core 44 is shaped to contact the second surface 20 or underneath of the flange 12 such that the top surface 48 is flush with the flange 12. Hence, the core 44 is designed to achieve the greatest number of contact points possible with the flange 12 so as to maximize the support capabilities.

Furthermore, the inside surface 52 of the core 44 is also designed to mate with the portion of engine part 14 protruding from the fixture 38 as can be seen in FIG. 5. In the illustrated case, the inside surface 52 has a slot 56 along the longitudinal axis of the core 44 to engage with a male feature of the cylindrical body 16 particular to the exemplified engine part 14 illustrated in FIGS. 4 and 7. Notably, this is merely an example of the configuration of the core 44 as the engine part 14 requiring work can vary in shape. Thus, it can be stated that the core 44 is propitiously suited for engagement with the fixture 38 and the protruding engine part 14 so as to maximally support the flange 12, whereby the support in mention is a flexible type of support.

In addition, FIGS. 4, 5 and 7 show the core 44 as having a bore 58 along its longitudinal axis. The bore 58 is adapted to receive a large O'ring to be threaded thru the segments 42 to keep them together as a unit. Bore 58 is optional only.

It should be understood that the engine parts to be reworked are analyzed on a case-by-case basis to determine the type of tooling required to yield the greatest efficiency. Thus, depending on the type of material and the nature of the rework requirements, a simple flat ring could be used instead of the torus segments 42 above-described to support the flange 12.

Figure 6:
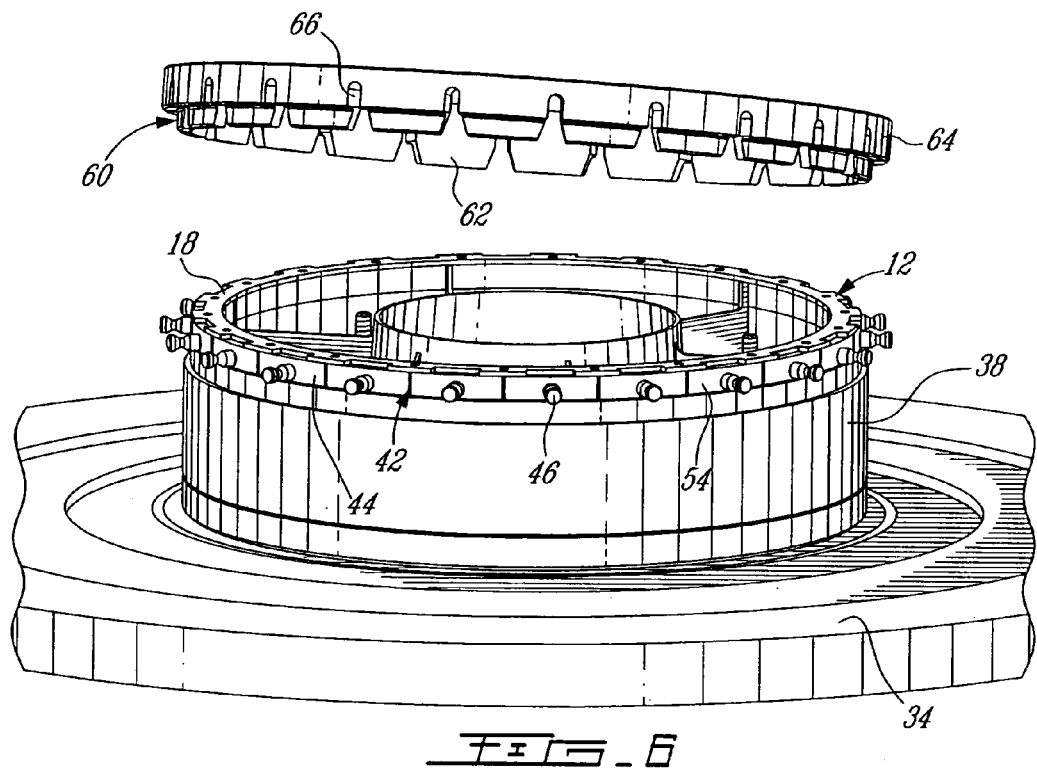
FIG. 6 is a perspective view of a containment ring being installed about the torus segments.

Now referring concurrently to FIGS. 2, 6 and 7, containment ring 60 included as part of the flange restoring device 10 is illustrated. The containment ring 60 is multifunctional in that it: acts to prevent the expansion by centrifugal force of the flange 12 in an outer radial direction after the engine part is loaded into the fixture, it serves to ensure that the torus segments 42 are equidistantly spaced, preventing an excessive gap at any one spot along the circumference of the cylindrical body 16, and it also contains the segments 42 in the event of a catastrophic failure.

The containment ring 60 is adapted to engage the torus segments 42 upon installation thereby circumscribing the perimeter 22 of the flange 12. In this exemplary embodiment, the containment ring 60 is provided in the form of a circular member having an inner side 62 and an outer side 64 defining a discrete number of downwardly open ended apertures 66 therebetween: The number of apertures 66 corresponds to the number of torus segments 42 each having a cylindrical protruding piece 46. Particularly, the apertures 66 are of a U-shape so as to engage with the protruding cylindrical pieces 46 such that the latter slot into the apertures 66 upon proper positioning of the containment ring 60.

Furthermore, upon installation of the containment ring 60, the inner side 62 thereof comes into contact with the perimeter 22 of the flange 12 and the torus segments 42 (FIG. 2). Notably, the containment ring 60 could alternatively be designed to additionally come into contact with the fixture 38 as best demonstrated in FIG. 7.

Now referring concurrently to FIGS. 2 and 7, a wear pad 68 of the type commonly known in the art is included to act as an intermediary load distributing element. The wear pad 68 ensures that the pressure applied by the hydraulic roller 26 to the first surface 18 of the flange 12 does not mark the engine part 14 and that the load is distributed evenly thereacross. The wear pad 68 is placed between the hydraulic roller 26 and the flange 12 on top of the first surface 18 of the flange 12.

It is preferable that the wear pad 68 be at least as wide as the first surface 18 of the flange 12 to cover the entire flange 12 for protection. Also, for security purposes the wear pad 68 should abut the inner side 62 of the containment ring 60 as illustrated in FIGS. 2 and 7. The wear pad 68 can be made of a variety of materials able to repeatedly withstand loading: steel being commonly utilized.

METHOD OF RESTORING A FLANGE OF AN ENGINE PART

The principal function of the flange restoring device 10 is to rework the flange of an engine part without the removal of material so that the engineering requirements for repair are met.

Firstly, the engine part 14 is properly inserted in the fixture 38 followed by the instalment of the support element 40 (FIGS. 3 and 4). In the case where the torus segments 42 are utilized, they are each individually inserted between the underneath 20 of the flange 12 and the portion of the fixture 38 configured for mating therewith. Also, the torus segments 42 are positioned against the portion of the cylindrical body 16 protruding from the fixture 38.

Next, the containment ring 60 is installed so as to sit on the radially protruding pieces 46 of the torus segments 42 by way of the U-shaped apertures 66. The latter, being equidistantly spaced around the containment ring 60 ensure that the torus segments 42 are accurately placed and keep them in position (FIG. 6).

Next, the wear pad 68 is installed over the flange 12 abutting the containment ring 60 to act as an intermediary load distributing element. The hydraulic roller 26 is then moved into position over the flange 12 by way of the hand wheel 28 (FIG. 8). The hydraulic roller 26 is then lowered to come into contact with the wear pad 68 (FIG. 1). At this point the controls in the control box 32 are activated appropriately (FIG. 9). And finally a measurable amount of hydraulic pressure is manually applied by way of a hydraulic hand pump 30 (FIG. 10). Pressures between 1000 to 1500 lbs are applied depending on the condition of the part to be reworked.

In restoring the flange 12, the hydraulic roller 26 applies a force that is preferably perpendicular to the flange 12 as illustrated in FIG. 2. The turn table 34 is electrically driven to rotate the engine part 14 about its central axis 36 at a constant speed, thereby causing the roller 26 to roll over the flange 12.

As the force is applied sequentially around the circular radially flange 12, the torus segments 42 provide a flexible support to the flange 12 throughout the reworking process. In further detail the torus segments 42 have the ability to individually tilt towards or away from the central axis 36 of rotation as they have a convex curvature that is seated on a concave portion of the fixture 38. The segments 42 tilt to allow the flange 12 to slide across the flat surface on the top of the segments 42. Thus, a flexible means of supporting the flange 12 is advantageous in reworking particular materials such as Inconel 600 or 625 that are very tough to work having been distorted by heat and hardened by repeated stresses.

The new method of restoring a flange of an engine part is advantageous in that a significant number of operations have been eliminated permitting to process engine parts within a controlled environment yielding improved results. Furthermore, engine parts can be processed within a given time frame while still reducing the overall cost of the rework thereby ensuring customer satisfaction. Moreover, the above-described method also ensures the safety of the employees.

The above description is meant to be exemplary only, and one skilled in the art will recognize that changes may be made to the embodiments described without departent from the scope of the invention disclosed. For example, the hydraulic roller could potentially be rotated around the flange rather than having the turn table rotates the engine part. In another example, the flange restoring device above described could be modified to accommodate engine parts and flanges of various shapes. In a further example, the entire process of restoring a flange could be automated thus eliminating the necessity of an individual applying pressure by a hydraulic hand pump or installing the torus segments and containment ring. Still other modifications which fall within the scope of the present invention will be apparent to those skilled in the art, in light of a review of this disclosure, and such modifications are intended to fall within the appended claims.

The invention claimed is:

1. A method of restoring a flange which has become distorted over time, the flange projecting at an angle from a component part, the method comprising the steps of;
   a) providing a support element on a first side of the flange by mounting a plurality of support segments along a perimeter of the flange, the support segments being mounted such as to permit tilting movement;
   b) rolling a load applying element over a second opposite side of the flange with said support segments reacting the compressive loads applied by said load applying element on said flange; and c) maintaining the angle between the flange and the component part during load application by way of the support element.

2. The method according to claim 1, wherein step c comprises the step of providing said support element at a same angle as said flange relative to the component part.

3. The method according to claim 1, wherein said support segments have a curved bottom surface and a top bearing surface for supporting said flange, wherein step b) further comprises the step of mounting the support segments on top of a fixture with said curved bottom surface of each of said support segments in mating engagement with a corresponding female portion defined in said fixture.

4. The method according to claim 3, wherein said fixture is mounted to a turn table having a central axis of rotation, and wherein step a) comprises the step of circumferentially distributing said support segments about said central axis to form a segmented support ring, said curved bottom surface thereof being oriented for allowing said segments to tilt towards said central axis of rotation.

5. The method according to claim 4, wherein step b) comprises the step of pressing the load applying element against said second opposite surface end rotating said turn table about said central axis thereof to cause a relative movement between said load applying element and said flange.

6. The method according to claim 1, further comprising the step of equally spacing said support segments along the perimeter of said flange by engaging said support segments with a containment member having a plurality of segment localisation aids.

7. The method according to claim 1, further comprising the step of circumscribing said support segments with a containment member, said support segments being interconnected to each other via said containment member.

8. The method according to claim 7, wherein the containment member is configured to mate with the support segments upon installation thereon.

9. The method according to claim 1, further comprising die step of: preventing the expansion of a perimeter of the flange by providing a containment element abutting the perimeter of the flange.

10. The method according to claim 1, further comprising the step of: providing an intermediary load distributing element between the compressive load applying element and the flange.

11. A method of restoring a flange extending at an angle from a part, the method comprising the step of: straightening out irregularities in the flange by pressing a roller against a first side of the flange while supporting an opposite side thereof on a plurality of tiltable support segments to preserve said angle between the part and the flange when undergoing compression loading by way of said roller, the support segments having the ability to tilt in reaction to a load applied by the roller onto the flange.

12. The method according to claim 11, wherein said support segments form a support element along the perimeter of the flange, and wherein the method comprises the step of: providing said support element at a same angle as said flange relative to the part.

13. The method according to claim 11, wherein said support segments have a curved bottom surface and a top bearing surface for supporting said flange, the method further comprises the step of mounting the support segments on top of a fixture adapted to hold said part with said curved bottom surface of each of said support segments in mating engagement with a corresponding female portion defined in said fixture.

14. The method according to claim 13, wherein said fixture is mounted to a turn table having a central axis of rotation, said support segments being circumferentially distributed about said central axis to form a segmented support ring, and wherein said curved bottom surface is oriented for allowing said segments to tilt towards said central axis of rotation.

15. The method according to claim 14, comprising the step of rotating said turn table about said central axis thereof to cause a relative movement between said roller and said flange.

16. The method according to claim 11, further comprising the step of equally spacing said support segments along a perimeter of said flange by engaging said support segments with a containment member having a plurality of segment localisation aids.

17. The method according to claim 11, further comprising the step of circumscribing said support segments with a containment member, said support segments being interconnected to each other via said containment member.

18. A method of flattening a circular radial flange, comprising the steps of: a) applying a flattening load to one side of the flange sequentially around a circumference of the flange, and b) providing a plurality of ring segments on an opposite side of the flange to oppose the flattening load, said ring segments being mounted for allowing tilting movement thereof when the flange undergoes flattening loading.

19. The method according to claim 18, wherein said ring segments have a curved bottom surface and a substantially flat top bearing surface for uniformly supporting said flange wherein step b) further comprises the step of mounting the ring segments atop of a fixture with said curved bottom surface of each of said ring segments in mating engagement with a corresponding female portion of said fixture.

20. The method according to claim 19, wherein said fixture is mounted to a turn table having a central axis of rotation, said ring segments being circumferentially distributed about said central axis to form a segmented support ring, and wherein said curved bottom surface is oriented for allowing said segments to tilt towards said central axis of rotation.

21. The method according to claim 18, wherein step a) comprises the steps of: pressing a roller against said one side of the flange and causing the roller to roll thereover while said opposite side of the frame is being supported.

22. A method of restoring a flange which has become distorted over time, the flange projecting at an angle from a component part, the method comprising the steps of:
    a) providing a support element on a first side of the flange, the support element being segmented into a plurality of support segments;
    b) rolling a load applying element over a second opposite side of the flange with said support element reacting the compressive loads applied by said load applying element on said flange; and
    c) maintaining the angle between the flange and the component part during load application by way of the support element,
further comprising the step of circumscribing said support segments with a containment member, said support segments being interconnected to each other via said containment member.

* * * * *